United States Patent [19]

Harper

[11] Patent Number: 5,046,284
[45] Date of Patent: Sep. 10, 1991

[54] ANTI-THEFT VEHICLE WINDOW

[76] Inventor: David Harper, 8105 E. 93rd St., Apt. 905, Tulsa, Okla. 74133

[21] Appl. No.: 580,074

[22] Filed: Sep. 10, 1990

[51] Int. Cl.⁵ .............................................. E06B 3/32
[52] U.S. Cl. ........................................ 49/463; 49/465; 296/218; 52/476
[58] Field of Search .............. 49/380, 463, 465, 466; 160/215; 52/474, 476; 296/218

[56] References Cited

U.S. PATENT DOCUMENTS

| | | | |
|---|---|---|---|
| 2,254,947 | 9/1941 | Judge et al. | 49/380 X |
| 2,257,035 | 9/1941 | Chaffee | 52/476 X |
| 2,906,863 | 9/1959 | Ritter | 49/463 X |
| 3,305,999 | 2/1967 | Bohn | 52/476 X |
| 3,521,403 | 7/1970 | Bouwkamp | 49/324 |
| 3,770,312 | 11/1973 | Shadburn | 296/28 |
| 3,952,473 | 4/1976 | Jesse | 52/476 X |
| 4,113,303 | 9/1978 | Yench | 49/465 X |
| 4,119,341 | 10/1978 | Cook | 296/146 |
| 4,281,476 | 8/1981 | LeVan | 49/465 X |
| 4,363,349 | 12/1982 | Childs | 49/463 X |
| 4,484,773 | 11/1984 | Lehne | 49/465 X |
| 4,487,449 | 12/1984 | Igel et al. | 296/218 X |
| 4,534,587 | 8/1985 | Fleming | 49/465 X |
| 4,620,746 | 11/1986 | Alexander | 296/201 |
| 4,659,138 | 4/1987 | Gosse et al. | 296/201 |
| 4,719,736 | 1/1988 | Aho et al. | 52/397 |
| 4,750,781 | 6/1988 | Betteridge | 296/218 X |
| 4,765,676 | 8/1988 | Grimm et al. | 296/218 X |
| 4,834,447 | 5/1989 | Higgins | 296/201 |
| 4,927,208 | 5/1990 | Farmont | 296/218 X |

FOREIGN PATENT DOCUMENTS

| | | | |
|---|---|---|---|
| 1232328 | 1/1967 | Fed. Rep. of Germany | 52/476 |
| 3241652 | 5/1984 | Fed. Rep. of Germany | 296/218 |

Primary Examiner—Rodney M. Lindsey
Assistant Examiner—Jerry Redman
Attorney, Agent, or Firm—Head & Johnson

[57] ABSTRACT

An anti-theft device for a vehicle having a window pane within a rim forming an opening in the vehicle. An interior frame has a plurality of openings extending therethrough. An exterior frame, capable of mating with the interior frame, has a recess extending around the frame and a plurality of openings extending into but not through the exterior frame. A sheath, extending around and receiving the edge of the window pane, has at least one handle extending therefrom. A latch extends from the sheath and is enagable with the interior frame. Fasteners are receivable through the interior frame openings and into the exterior frames openings so that the window pane within the surrounding sheath may be placed in the recess and engaged with the interior frame by use of the latch.

4 Claims, 4 Drawing Sheets

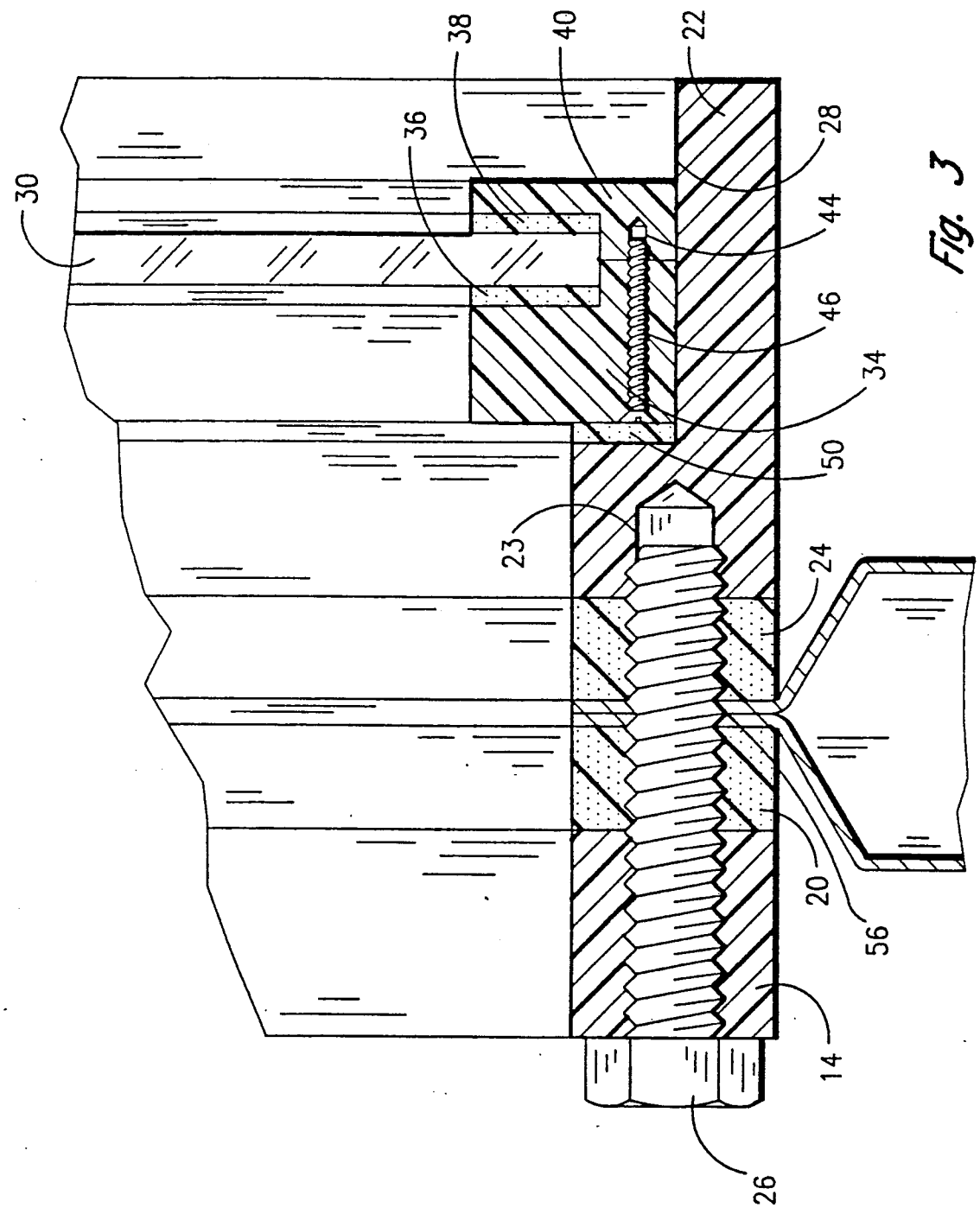

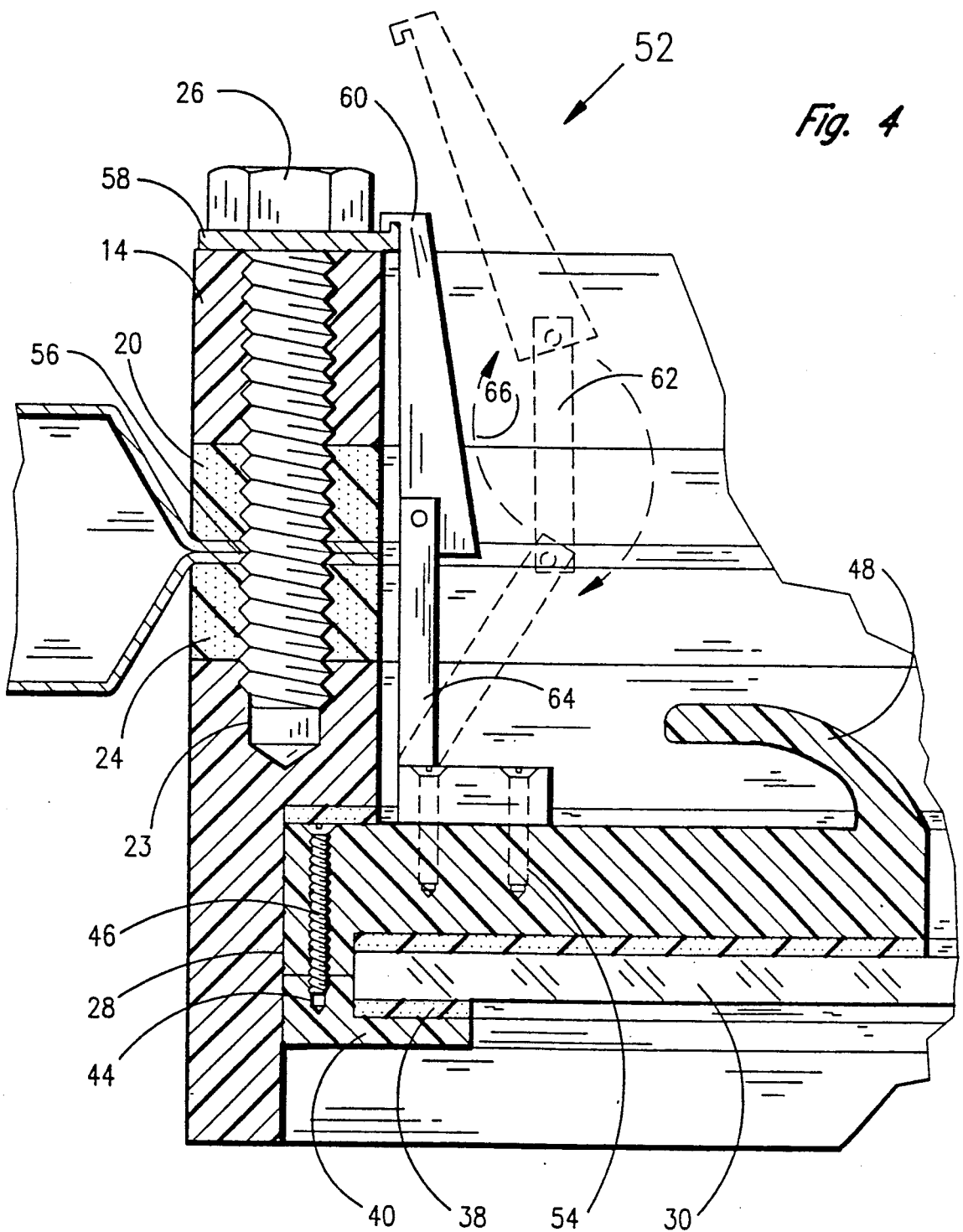

ANTI-THEFT VEHICLE WINDOW

BACKGROUND OF THE INVENTION

1. Field of the Invention

The present invention relates to an anti-theft vehicle window device. In particular, the present invention relates to an anti-heft vehicle window device which will allow the existing window pane to be removably attached to the device.

2. Prior Art

Vehicle theft and vandalism are an increasing problem. In a typical vehicle, the existing rear window is simply held in place by a continuous rubber gasket around the edge of the window which is fitted to an opening in the shell of the vehicle. The window can be easily pried open with a screw driver or other instrument.

At the same time, in pickup trucks and other vehicles, it is sometimes desirable to remove the rear window in order to provide access from the interior of the cab to the truck bed.

A patentability search was conducted on the above invention and the Applicant is aware of the following U.S. patents.

| U.S. PAT. NO. | INVENTOR | DATE ISSUED |
| --- | --- | --- |
| 3,521,403 | Bouwkamp | 1970 |
| 3,770,312 | Shadburn | 1973 |
| 4,119,341 | Cook | 1978 |
| 4,620,746 | Alexander | 1986 |
| 4,659,138 | Gosse et al | 1987 |
| 4,719,736 | Aho et al | 1988 |
| 4,834,447 | Higgins | 1989 |

In Higgins (U.S. Pat. No. 4,834,447), an exterior frame section holds a window and an interior frame section is secured to it by screws.

Shadburn (U.S. Pat. No. 3,770,312) discloses a rear truck window held in place by a pair of lower hinge members, each having a channel to receive an edge of the window. On the top edge of the window are bracket members, which are connected to the lower hinge members by extending rods. The top bracket members are detachable from the cab by toggle links and hooks.

Bouwkamp (U.S. Pat. No. 3,521,403) discloses a surrounding frame or flange around an edge of a window. Bolts pass through the window and the frame to secure the window to an opening in the vehicle.

Cook (U.S. Pat. No. 4,119,341) discloses a removable rear window that is received in a U-shaped channel member having a gasket.

Alexander (U.S. Pat. No. 4,620,746), Gösse et al (U.S. Pat. No. 4,659,138) and Aho et al (U.S. Pat. No. 4,719,736) each disclose window assemblies.

Accordingly, it is a principal object and purpose of the invention to provide a vehicle window unit which is resistant to tampering.

It is a further object and purpose of the present invention to provide an anti-theft vehicle window unit wherein the window pane may be removably attached to the unit.

SUMMARY OF THE INVENTION

The anti-theft vehicle window of the present invention includes a continuous interior frame section which corresponds in size to a rim forming an opening in the vehicle. A plurality of openings extend through the interior frame section. A corresponding exterior frame section has a plurality of openings extending into but not through the exterior frame section. A continuous seal may be juxtaposed between the interior frame section and the rim and a continuous seal may be juxtaposed between the rim and the exterior frame section. The interior frame section, the exterior frame section and the corresponding seals are held in place by a plurality of bolts, which also pass through apertures in the vehicle.

The exterior frame section has a recessed portion which forms a continuous shoulder around one side of the exterior frame section.

The window pane has a continuous sheath surrounding its edge. Extending from the sheath are a pair of handles accessible from the interior.

The sheath and accompanying window pane fit within the recessed shoulder of the exterior frame. A pair of detachable latches extend between the sheath and the interior frame member.

BRIEF DESCRIPTION OF THE DRAWINGS

FIG. 5 is a partial sectional view taken along section line 3—3 of FIG. 1; and

FIG. 4 is a partial sectional view taken along section line 4—4 of FIG. 1.

DETAILED DESCRIPTION OF THE PREFERRED EMBODIMENTS

Figure 2:
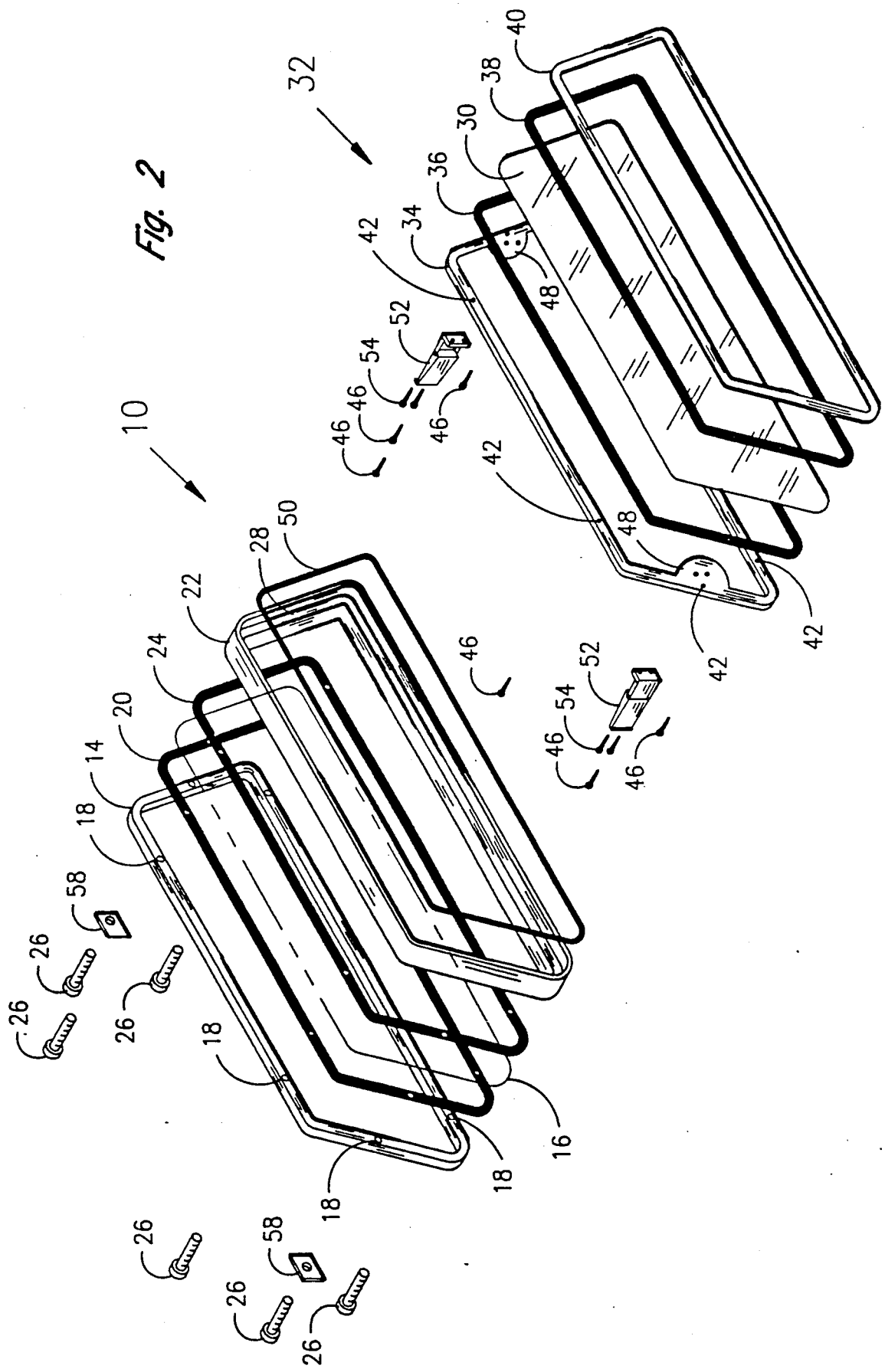
FIG. 2 an exploded view of the present invention as shown in FIG. 1.

Referring to the drawings in detail, FIG. shows an elevational view and FIG. 2 shows an exploded view of an anti-theft vehicle window of the present invention.

It will be appreciated that the present invention could be installed during manufacture of the vehicle or, alternatively, could be added to existing vehicles. The present invention has application particularly for truck rear windows, although it may be used with nearly all types of vehicles.

A continuous interior frame section 14 corresponds in size to the rim 16 that forms an opening in the vehicle shown by a dashed line 16 in FIG. 2. A plurality of openings 18 extend through the interior frame section 14. Juxtaposed between the interior frame section and the vehicle shell may be a continuous gasket 20 (not seen in FIG. 1). The interior frame section would be mounted from the interior of the vehicle.

A corresponding exterior frame section 22 (not seen in FIG. 1) has a plurality of openings 23 (not seen in FIGS. 1 or 2) extending into but not through the exterior frame section. A continuous seal 24 may be juxtaposed between the rim 16 of the vehicle and the exterior frame section 22. The exterior frame section would be mounted from the exterior of the vehicle. The interior frame section 14, the exterior frame section 22, and the corresponding seals 20 and 24 would be held in place by a plurality of screws or bolts 26. As will be described herein, the bolts also pass through apertures in the vehicle shell so that the interior section and the exterior frame section are firmly attached to the vehicle itself.

Exterior frame section 22 has a recessed portion which forms a continuous shoulder 28 around one side of the exterior frame section 22. The continuous shoulder 28 will be located on the side opposite to the openings 23 in the exterior frame. As will be seen herein, the shoulder 28 corresponds and is slightly larger than the exterior dimension of the window pane 30.

The window pane 30 has a continuous sheath surrounding its edge. With particular reference to FIG. 2, the sheath 32 is comprised of interior sheath section 34, interior gasket 36, exterior gasket 38 and exterior sheath section 40. A plurality of sheath openings 42 extend through the interior sheath section. These openings mate with sheath openings 44 extending into but not through the exterior sheath section 40. A plurality of screws 46 hold the sheath sections 34 and 40 and the gaskets 36 and 38 snugly around the edge of the window pane 30. The openings 44 may be threaded to receive the screws 46. Extending from the interior sheath 34 are a pair of handles 48. When in place, the handles are accessible from the interior of the vehicle.

The sheath 32 and accompanying window pane 30 fit within the recessed shoulder 28 of the exterior frame 22. A continuous seal 50 may be placed in the shoulder to provide a liquid tight and an air tight seal between the exterior frame section and the sheath 32. It will be appreciated that the sheath 32 might be composed of a different arrangement of elements.

The sheath 32 and window pane 30 are removably connected to the frame sections and, in turn, the vehicle. A pair of latches 52 (only one latch visible in FIG. 4) extends between the sheath 32 and the interior frame member 14. Screws 54 or other fasteners may be used to hold the latch 52 securely to the sheath 32.

Figure 1:
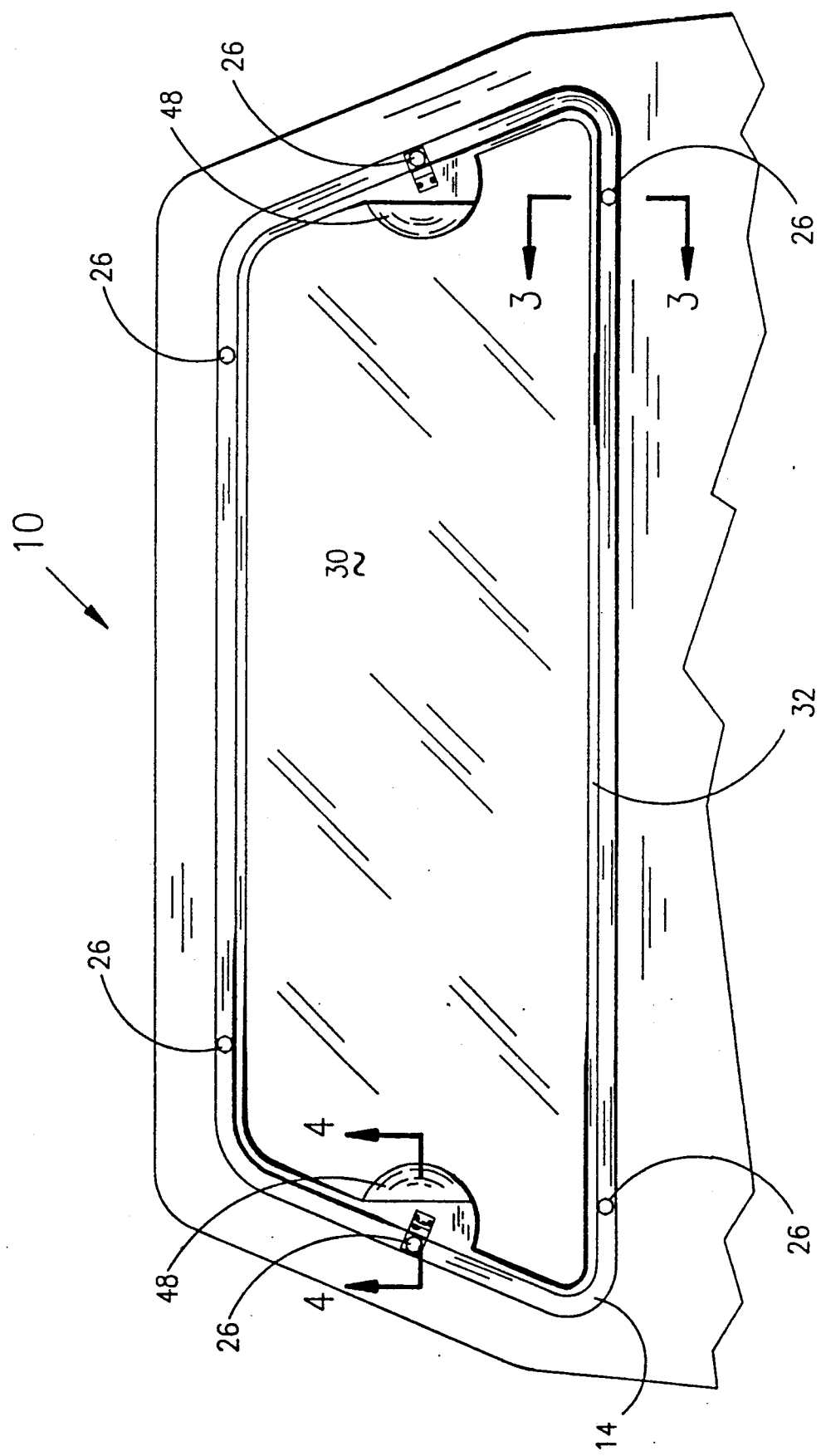
FIG. 1 shows an elevational view from the interior of the vehicle constructed in accordance with the present invention.

FIG. 3 depicts a sectional view taken along section line 3—3 of FIG. 1 with one of the bolts 26 visible. The bolt 26 passes through interior frame section 14, through seals 20 and 24, and into an opening 23 in exterior frame section 22. The opening 23 may be threaded to receive the bolt 26. Bolt 26 also passes through an opening 56 in the rim 16 of the vehicle. Accordingly, the unit is securely fixed to the vehicle itself. Since the bolts extend from the interior and no portion is exposed to the exterior, tampering with the bolts is difficult.

While the window pane 30 and its accompanying sheath 32 are accessible from the interior of the vehicle, they would normally be installed from the exterior of the vehicle.

FIG. 4 is a partial sectional view taken along section line 4—4 of FIG. 1 wherein one of the latches 52 is visible. It should be understood that while one type of latch is shown, other types of latches or detachable connectors might be utilized. A lip retainer 58 has a central aperture larger than the bolt and is held in place between the bolt 26 and the interior frame section 14. The latch 52 has a hook portion 60 which will engage with the lip retainer 58. Pivotally attached to the hook portion is a central portion 62. Pivotally attached to the central portion is an end portion 64. The end portion 64 is, in turn, pivotally attached to the exterior sheath section 34. In order to lock the window in place, the hook portion is extended and then engaged with the lip retainer 58. The central portion 62 is moved in the direction of arrow 66. The hook portion and end portion are then moved downward to lock the latch. In the final locked position of the latch 52, central portion 62 is hidden under end portion 64.

In order to install the device in a vehicle, the existing window pane 30 is removed along with the existing gasket (not shown). Openings 56 are made in the vehicle to mate with the openings 18 in the interior frame section 14 and the openings 23 in the exterior frame section 22. The bolts are then installed through the openings 18 in the interior frame 14, through continuous gasket 20, through openings 56 in the vehicle, through continuous gasket 24, and into openings 23 in exterior frame section 22.

The sheath 32 is then installed around the edge of window pane 30. Finally, by reaching through the frame sections 14 and 22 from the interior of the vehicle, the handles 48 will be grasped and the window pane 30 and accompanying sheath will be brought into place on the shoulder. The latches can then be connected with the lip retainers.

If it is subsequently desired to remove the window pane for ventilation or access to the rear of the truck, the latches 52 may be disengaged from the interior of the vehicle. The handles may then be grasped and the window pane removed.

From the foregoing, it can be appreciated that once installed, the device will frustrate attempts to pry the window open. Even if a screwdriver or other instrument is wedged between the sheath 32 and the exterior frame member, the shoulder will block penetration into the interior of the vehicle.

Whereas the present invention has been described in relation to the drawings attached hereto, it should be understood that other and further modifications, apart from those shown or suggested herein, may be made within the spirit and scope of this invention.

What is claimed is:

1. An anti-theft device for a vehicle haVing a Window pane supported within a rim forming an opening in said vehicle, which device comprises; an interior frame having a plurality of openings extending there through; an exterior frame capable of mating with said interior frame, said exterior frame having a recess extending around said frame and a plurality of openings extending into but not through said exterior frame, said exterior frame openings mating with said interior frame openings; a sheath extending around and receiving the edge of said window pane, said sheath having at least one handle extending therefrom; latch means extending from said sheath and engagable with said interior frame; a plurality of fasteners receivable through said interior frame openings and into said exterior frame openings so that said window pane within said surrounding sheath may be placed in said recess and engaged with said interior frame by use of said latch means.

2. An anti-theft device for a vehicle as set forth in claim 1 wherein said sheath is comprised of two sections held together by fasteners.

3. An anti-theft device for a vehicle having a window pane supported within a rim forming an opening in said vehicle, which device comprises; an interior frame having a plurality of openings extending there through; an exterior frame capable of mating with said interior frame, said exterior frame having a recess extending around said frame and a plurality of openings extending into but not through said exterior frame, said exterior frame openings mating with said interior frame openings; a seal between said interior frame and said rim of said vehicle; a seal between said rim of said vehicle and said exterior frame; a sheath extending around and receiving the edge of said window pane, said sheath having at least one handle extending therefrom; latch means extending from said sheath and engageable with said interior frame; a plurality of fasteners receivable through said interior frame openings and into said exterior frame openings so that said window pane within said surrounding sheath may be placed in said recess and engaged with said interior frame by use of said latch means.

4. An anti-theft device for a vehicle having a window pane supported within a rim forming an opening in said vehicle, which device comprises; an interior frame having a plurality of openings extending there through; an exterior frame capable of mating with said interior frame, said exterior frame having a recess extending around said frame and a plurality of openings extending into but not through said exterior frame, said exterior frame openings mating with said interior frame openings; a sheath extending around and receiving the edge of said window pane, said sheath having at least one handle extending therefrom; latch means extending from said sheath and engageable with said interior frame; a plurality of fasteners receivable through said interior frame openings, through apertures provided in said vehicle near said rim and into said exterior frame openings so that said window pane within said surrounding sheath may be placed in said recess and engaged with said interior frame by use of said latch means.

* * * * *